US008348549B2

(12) United States Patent
Stiles et al.

(10) Patent No.: US 8,348,549 B2
(45) Date of Patent: *Jan. 8, 2013

(54) METHOD AND APPARATUS FOR ABSORPTIVE BOOM

(76) Inventors: Brady A. Stiles, Missoula, MT (US); Jamey J. Flannery, Missoula, MT (US)

(*) Notice: Subject to any disclaimer, the term of this patent is extended or adjusted under 35 U.S.C. 154(b) by 231 days.

This patent is subject to a terminal disclaimer.

(21) Appl. No.: 12/806,076

(22) Filed: Aug. 4, 2010

(65) Prior Publication Data

US 2012/0020732 A1 Jan. 26, 2012

Related U.S. Application Data (63) Continuation-in-part of application No. 12/804,215, filed on Jul. 17, 2010, now abandoned.

(51) Int. Cl.
*E02B 15/08* (2006.01)
(52) U.S. Cl. ............... 405/70; 405/60; 405/63
(58) Field of Classification Search .......... 405/60, 405/63, 64, 65, 68, 70, 71, 72
See application file for complete search history.

(56) References Cited

U.S. PATENT DOCUMENTS

| | | | |
|---|---|---|---|
| 3,537,587 A | | 11/1970 | Kain |
| 3,565,257 A | * | 2/1971 | Cavalieri et al. ............ 405/63 |
| 3,592,006 A | | 7/1971 | Crucet |
| 3,998,060 A | * | 12/1976 | Preus ........................ 405/70 |
| 4,065,923 A | * | 1/1978 | Preus ........................ 405/70 |
| 4,781,493 A | * | 11/1988 | Fischer ...................... 405/63 |
| 4,919,820 A | | 4/1990 | Lafay et al. |
| 5,102,261 A | | 4/1992 | Gunderson, III |
| 5,165,821 A | | 11/1992 | Fischer et al. |
| 5,453,191 A | * | 9/1995 | McCrory et al. ............ 210/242.4 |
| 5,468,536 A | * | 11/1995 | Whitcomb et al. .......... 405/63 |
| 5,509,756 A | | 4/1996 | Chou et al. |
| 5,547,313 A | * | 8/1996 | Holland ...................... 405/63 |
| 5,591,333 A | * | 1/1997 | Hobin et al. ................. 405/72 |
| 5,688,075 A | * | 11/1997 | Gradek ....................... 405/63 |
| 5,871,305 A | * | 2/1999 | Allen ......................... 405/70 |
| 6,485,229 B1 | * | 11/2002 | Gunderson et al. ......... 405/63 |
| 6,743,367 B2 | | 6/2004 | Dreyer |
| 7,056,059 B1 | | 6/2006 | Wong et al. |
| 2003/0072616 A1 | * | 4/2003 | Dreyer ........................ 405/70 |
| 2003/0082006 A1 | * | 5/2003 | Dreyer ........................ 405/63 |
| 2004/0234339 A1 | * | 11/2004 | Dreyer ........................ 405/63 |

* cited by examiner

*Primary Examiner* — Frederick L Lagman
(74) *Attorney, Agent, or Firm* — George L Williamson

(57) ABSTRACT

Method and apparatus for a low floating boom curtain constructed of absorptive material made for use in waters polluted by oil, fuel, diesel fuel, chemicals such as dispersants or other petroleum based contaminants or the like wherein the boom curtain is comprised of an upper and a lower portion wherein the upper portion is the buoyant portion and the lower portion is a skirt portion, wherein the skirt portion has a weighted portion on the bottom of the skirt portion so that together they form an absorptive boom curtain for removing oil from oil containing waters. The upper portion, which provides the main flotation for the device, has an internal float/foam member which provides sufficient flotation and which foam member is wrapped in a single or double layer of absorptive material and wherein the entire device is made of and or covered by absorptive material. The boom curtain has a strap running longitudinally along it for interconnecting the individual curtain units wherein the strap may also have attachment rings and interconnecting rings for connecting individual units of the device so as to form a longer string of boom. The weighted portion may be weighted by any suitable material, however, it is believed that sand will be the weight of choice since it is also readily available.

21 Claims, 6 Drawing Sheets

METHOD AND APPARATUS FOR ABSORPTIVE BOOM

RELATED APPLICATIONS

This application is a Continuation-in-Part Application of U.S. patent application Ser. No. 12/804,215 filed on Jul. 17, 2010 now abandoned.

BACKGROUND OF THE INVENTION

1. Field of the Invention

The present invention relates generally to floating booms and, more particularly, is concerned with an absorptive floating boom.

2. Description of the Prior Art

Booms have been described in the prior art, however, it is believed that none of the prior art devices disclose the unique features of the present invention.

SUMMARY OF THE PRESENT INVENTION

The present invention discloses a low floating boom curtain constructed of absorptive material made for use in waters polluted by oil, fuel, diesel fuel, chemicals such as dispersants or other petroleum based contaminants or the like wherein the boom curtain is comprised of an upper and a lower portion wherein the upper portion is the buoyant portion and the lower portion is a skirt portion, wherein the skirt portion has a weighted portion on the bottom of the skirt portion so that together they form an absorptive boom curtain for removing oil from oil containing waters. The upper portion, which provides the main flotation for the device, has an internal float/foam member which provides sufficient flotation and which foam member is wrapped in a single or double layer of absorptive material and wherein the entire device is made of and or covered by absorptive material. The boom curtain has a strap running longitudinally along the device for interconnecting the individual curtain units wherein the strap may also have attachment rings and interconnecting rings for connecting individual units of the device so as to form a longer string of boom. The weighted portion may be weighted by any suitable material, however, it is believed that sand will be the weight of choice since it is also readily available.

An object of the present invention is to provide an absorptive boom for use with oil-containing waters wherein the material that the boom is made of will absorb oil from the oil-containing waters. A further object of the present invention is to provide booms which can be manufactured in units, which units may be interconnected so as to form a series or string of longer booms. A further object of the present invention is to provide a boom comprising absorptive material which will float relatively low in the water so that oil is discouraged from going under the boom but instead will be absorbed into the material of the boom wherein the contaminated boom can then be disposed in an acceptable landfill or other disposal site. A further object of the present invention is to provide a boom which can be easily used by an operator. A further object of the present invention is to provide a boom which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 upper portion
14 lower portion
16 weighted portion
18 buoyant member
20 first layer of absorptive material
22 second layer of absorptive material
24 strap
26 attachment ring/connector
28 interconnecting ring/connector
30 weight
32 stitching
34 hook/connector
36 first hook and loop material
37 second hook and loop material
38 upper edge portion
40 lower edge portion
42 first side portion
44 second side portion
46 front surface
48 rear surface
50 water surface
51 flexible absorbent material
52 spunbond
54 absorptive material
56 mesh 58 first pocket
60 second pocket
62 water
64 contaminants
66 sheet of flexible absorbent material
68 interior space
70 outer surface
72 inner surface
74 first wall
76 second wall
78 floor
80 angular disposition
82 angular disposition
84 angular disposition
86 angular disposition
88 stitching
90 stitching
92 direction of water flow
94 direction of water flow
96 direction of water flow
98 vertical axis

DETAILED DESCRIPTION OF THE PREFERRED EMBODIMENT

The following discussion describes in detail the preferred embodiment of the present invention along with another embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 9 illustrate the present invention wherein an absorptive boom curtain is disclosed.

Turning to FIGS. 1-6, therein is shown an embodiment of the present invention 10, being a low floating boom in the form of a curtain or sheet being entirely constructed of at least one sheet of oil absorptive flexible material 51 made for use in waters polluted by oil wherein the present invention is comprised of an upper and a lower portion 12, 14 wherein the upper portion is an enlarged buoyant portion and the lower portion is a skirt portion, wherein the skirt portion has a weighted portion 16 on the bottom portion of the skirt portion so that together they form an absorptive boom curtain for removing oil from oil containing waters. The present invention 10 is constructed of individual or single units which units may be strung together to form an elongated boom comprising a plurality of units. The upper boom portion 12 has an internally disposed flotation or buoyant member 18 being a foam member, float, air filled member or the like, contained in a first pocket 58 which provides a majority of the flotation to the present invention 10. The buoyant member 18 may have various shapes, e.g., round, square, rectangular, triangular, tear drop, or other so long as effective flotation and stability are provided. The present invention 10 is expected to be entirely covered by or constructed of single or multi-layers of absorptive flexible material 51 in the form of polypropylene, or the like, which material may be less dense than the density of water and therefore floats. However, other absorptive materials may be used which may be more or less dense than the density of water and which may or may not float. It should be clear that any effectively strong, durable, flexible and absorptive material could be used. Shown is a first and second layer 20, 22 of absorptive material 51 which surrounds the foam 18 in the upper boom portion. The skirt portion further comprises a high-strength flexible strap 24 disposed thereon running longitudinally along the front surface 46 from the first side portion 42 to the second side portion 44 wherein the strap has a plurality of auxiliary attachment rings 26, or similar connecting means, attached or disposed thereon and having one or more interconnecting rings 28, or the like connectors or means, and hooks 34, or similar connectors or means, configured for attachment to the strap so that the individual units of the present invention 10 can be linked together so as to form a series of units so that a relatively large length of the booms can be constructed. The strap 24 furnishes the main support or strength for holding the individual units of the present invention 10 together when they are interconnected to form a long length of boom. Strap 24 may comprise strapping, webbing, rope or the like. It can be seen that the skirt portion 14 comprises two layers 20, 22 of absorptive material 51 lying contiguously to each other. However, it may be possible that other absorptive material 51 may be used which may have one, two or more layers. The weighted portion 16 has a weighted material or ballast 30 such as sand, metal, steel, ceramic, rock or the like, which is held in place by the layers 22 being wrapped around the sand or like to form a sand pocket 60 and then sewn together or otherwise attached or mated to each other at 32. Auxiliary attachment rings 26 are also shown. The individual units or panels of the present invention 10 are configured so that they can be easily and quickly interconnected to form a long length of boom for placement in the water.

By way of further explanation of the present invention 10, and referring to FIGS. 1-6, the present invention discloses an apparatus and method for an oil boom curtain or panel for use in water 50, the water containing oil, comprising the following: a) a generally planar member forming a single curtain or panel being generally shown as the present invention 10, the curtain or panel comprising at least one sheet of flexible material 51 having an enlarged upper portion 12 having an upper edge portion 38 thereon, a lower portion 14 having a lower edge portion 40 thereon, first 42 and second 44 side portions, and front 46 and rear 48 surfaces; b) wherein the flexible material is oil absorptive, wherein the panel allows water to pass therethrough, wherein oil is thereby absorbed from the water onto the flexible material; c) the upper portion having a buoyant member 18 configured to be disposed thereon, wherein the buoyant member is effectively buoyant to cause the panel to float in the water; d) a weight 30 configured to be disposed on the lower edge portion of the lower portion, wherein the weight is effectively heavy to cause the lower portion to hang, depend from or be biased downwardly from the upper portion when the panel is in the water; e) a first strip of hook and loop material 36 configured to be disposed on the first side portion of the panel, wherein the first strip extends from the upper edge portion to said lower edge portion; f) a second strip of hook and loop material 37 configured to be disposed on the second side portion of the panel, wherein the second strip extends from the upper edge portion to the lower edge portion, wherein the first and second strips are oppositely configured so that the first and second strips are mating pieces of hook and loop material; g) a first connector or ring 28 configured to be disposed on the first side portion of the panel between the upper edge portion and the lower edge portion; and, h) a second connector or hook 34 configured to be disposed on the first side portion of the panel between the upper edge portion and the lower edge portion so that the hook of a first panel is connected to the ring of a second panel so as to form a series of boom comprising a plurality of panels. The upper portion has a first pocket 58 therein configured to have the buoyant member disposed therein; the lower edge portion has a second pocket 60 therein configured to have the weight disposed therein. The first strip of hook and loop material 36 of a first panel is connected to the second strip of hook and loop material 37 of a second panel so as to interconnect the first and second panels, wherein the passage of water 50 is thereby substantially prevented in between the first and second panels by the hook and loop material 36, 37, wherein a series of the boom is formed comprising a plurality of panels. The hook 34 (second connector) of a first said panel is configured to be connected to the ring 28 (first connector) of a second panel so as to interconnect the first and second panels so as to form a series of boom comprising a plurality of the panels. The buoyant member 18 is effectively buoyant to cause the upper portion of the panel to float low in the water so that the level of the water is approximately intermediate or about halfway up the upper portion so that the panel is stable in the water to cause the lower portion to hang downwardly substantially vertically from the upper portion when the panel is in calm water.

Figures 5, 6:
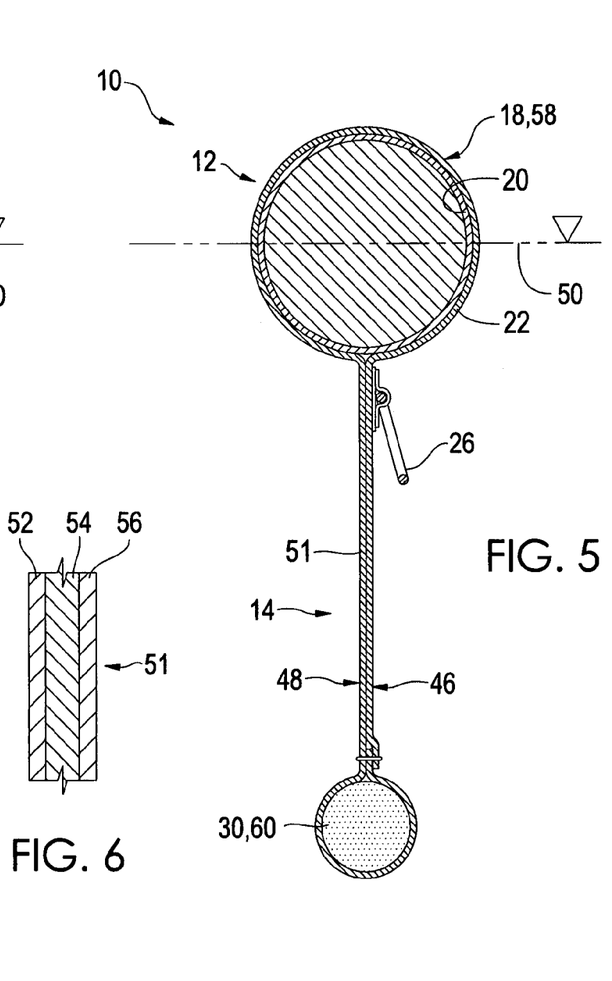
FIG. 5 is a cross sectional view of one embodiment of the present invention.
FIG. 6 is a cross sectional view of the flexible material of one embodiment of the present invention.

FIG. 6 shows an example of the flexible material 51 comprising an outer spunbond layer 52, a central absorptive material layer 54, and an outer mesh-like layer 56. Numerous types of absorptive material 51 could be used with the present invention 10 so long as the material was effectively absorptive, strong, flexible and durable. Layer 54 furnishes the major absorptive capacity for the material 51.

In operation, the present invention 10 is designed to float low in the water (i.e., only about half of the buoyant member 18, which is about 3-8 inches in diameter, is above the water surface) so as to create more surface to oil contact between the absorptive materials of the present invention and the oil contained in the water. The present invention is particularly suitable for oil removal or removal of similar floating contaminants from wetlands, marshland, rivers, around boats, piers, pilings, oil rigs and similar habitat. The absorptive material of the present invention absorbs many times its weight in oil and may float in the water so that a portion of the water passes through the material so that the oil or like contaminant is absorbed and retained on the material of which the present invention 10 is constructed. The present invention is manufactured, transported and stored in individual units which are several inches in height (i.e., from top to bottom) and several inches in width (i.e., from first side to second side) and being substantially formed in the shape of a rectangle. However, the size is variable and it is expected that the overall height could vary considerably and the skirt may vary in height from about 1½ inches to about 48 inches below the water surface. The present invention may be constructed of polypropylene blended material which absorbs several gallons of oil per individual unit of the present invention. It is believed that the polypropylene fibers suck up the oil, but polypropylene itself is naturally hydrophobic so it repels the water. The present invention may also be constructed of any material capable of absorbing oil, other petroleum based contaminants or the like. The polypropylene material of which the present invention is comprised, is less dense than water so that the material itself will float. Furthermore, the foam 18 of the present invention being less dense than water provides additional flotation for the boom of the present invention 10. Furthermore, the weighted portion 16 of the present invention keeps the skirt portion 14 in a downwardly extended substantially vertical configuration in calm water so as to provide maximum area of boom curtain surface across the water column so that as the contamination-containing water is transported through and around the skirt and boom curtain portion of the present invention the oil is absorbed, contained or otherwise removed from the water column.

It should be clear that the present invention 10 is vertically disposed in calm water, wherein an effective portion of the present invention floats under the surface of the water providing an absorptive curtain through which the water containing the oil is filtered. The present invention 10 also provides somewhat of a containment boom which contains oil even though water can pass through the absorptive layers 20, 22 of the present invention because the oil becomes entrapped and absorbed into layers 20, 22 as the water is allowed to pass through the layers 20, 22 of the present invention. While layers 20, 22 layers are shown, it may be possible to use materials having only one layer of material. The present invention 10 is maintained in generally a vertical configuration in calm water by having the boom portion 12 disposed on the surface of the water, and having the weighted portion 16 which causes the skirt portion 14 to be extended below or depend from the boom portion so that the present invention 10 is substantially vertically disposed in calm water.

Figure 1:
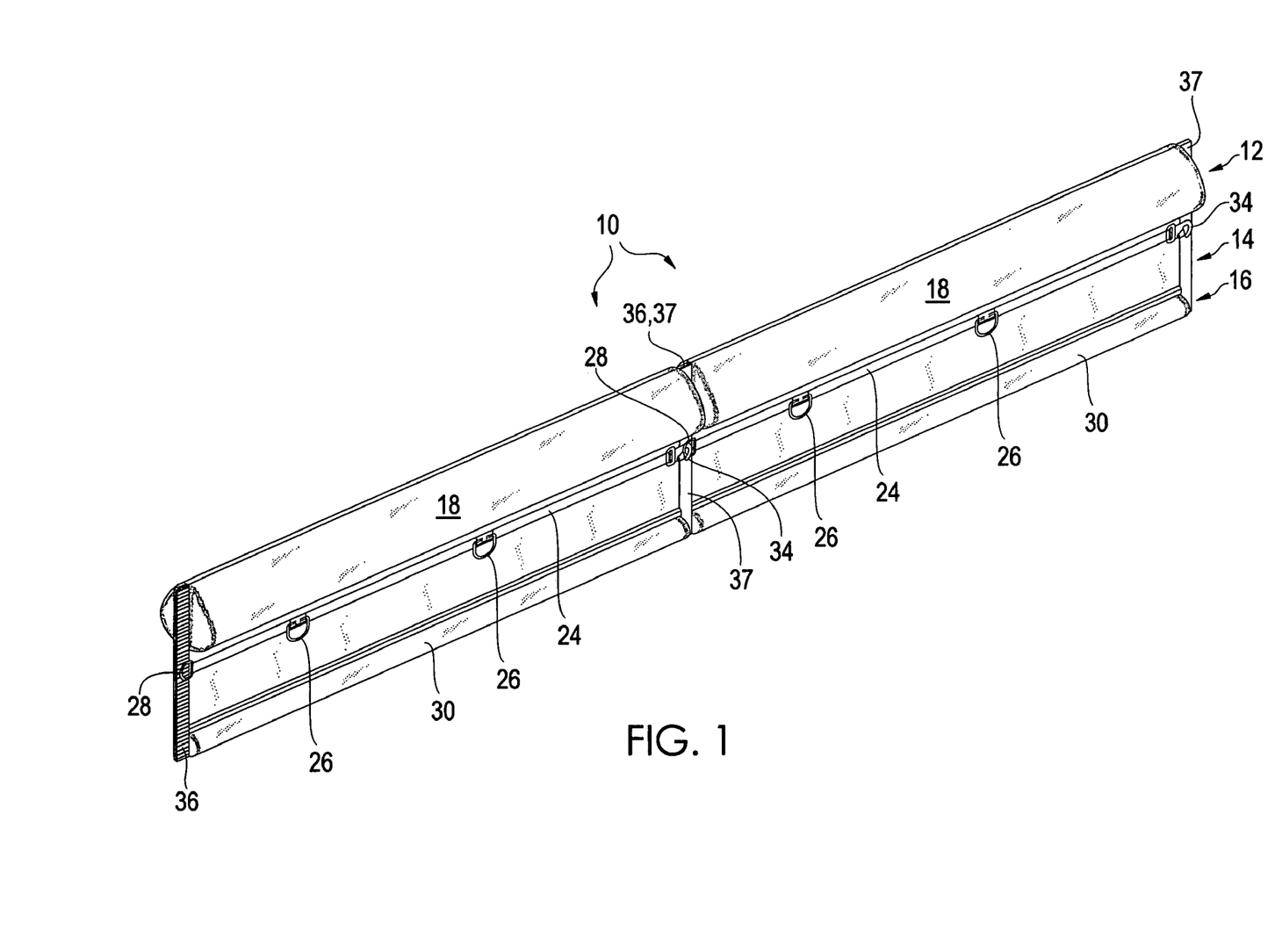
FIG. 1 is a perspective view of one embodiment of the present invention showing two curtains joined together to form an oil boom.
Figure 2:
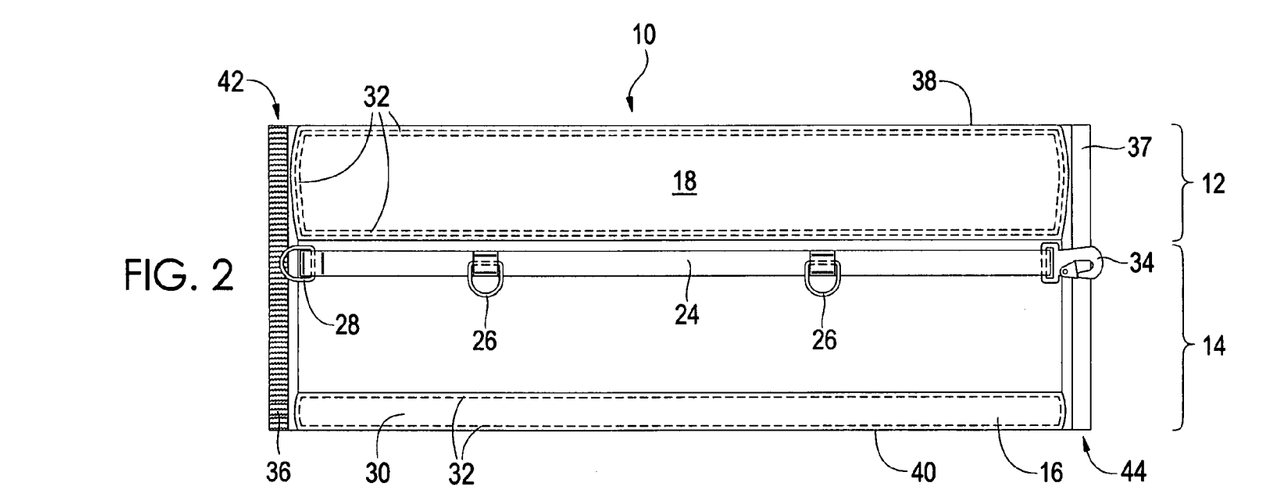
FIG. 2 is a front elevation view of one embodiment of the present invention.
Figure 3:
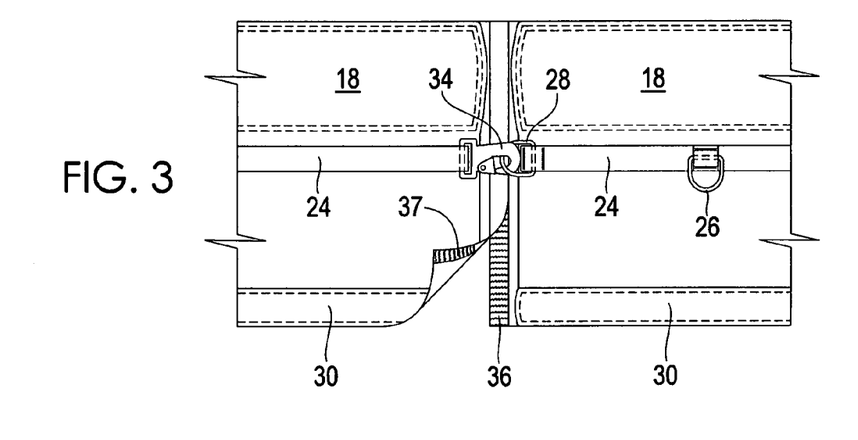
FIG. 3 is a front elevation view showing portions of two panels of one embodiment of the present invention joined together to form an oil boom.
Figure 4:
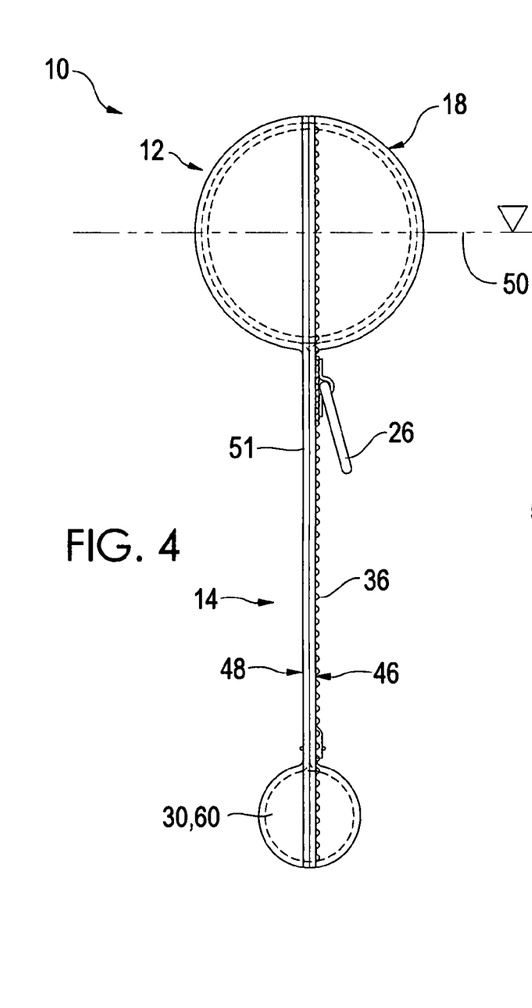
FIG. 4 is an end elevation view of one embodiment of the present invention.
Figure 7:
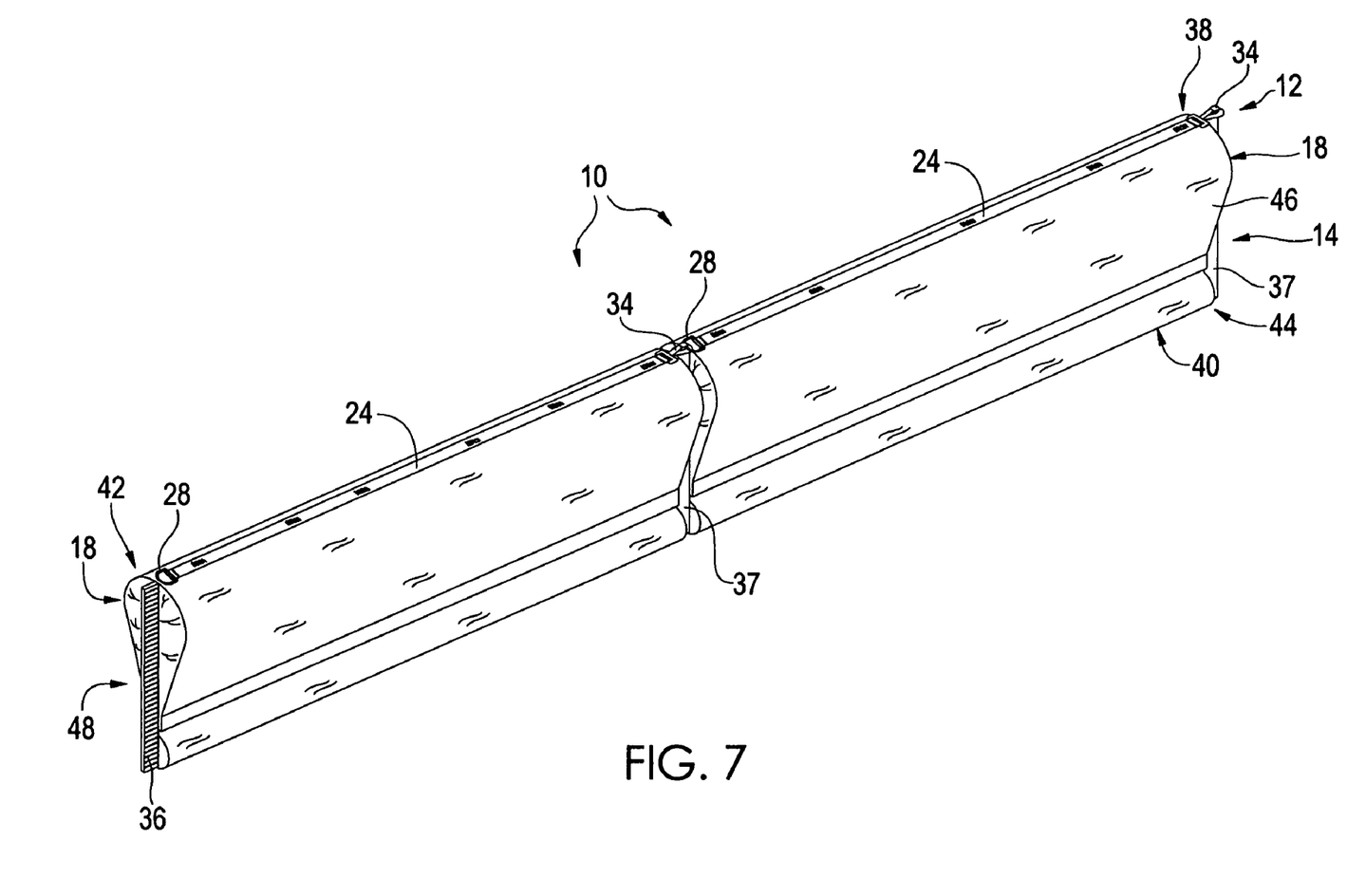
FIG. 7 is a perspective view of two curtains of the preferred embodiment of the present invention joined together to form an oil boom.
Figure 8:
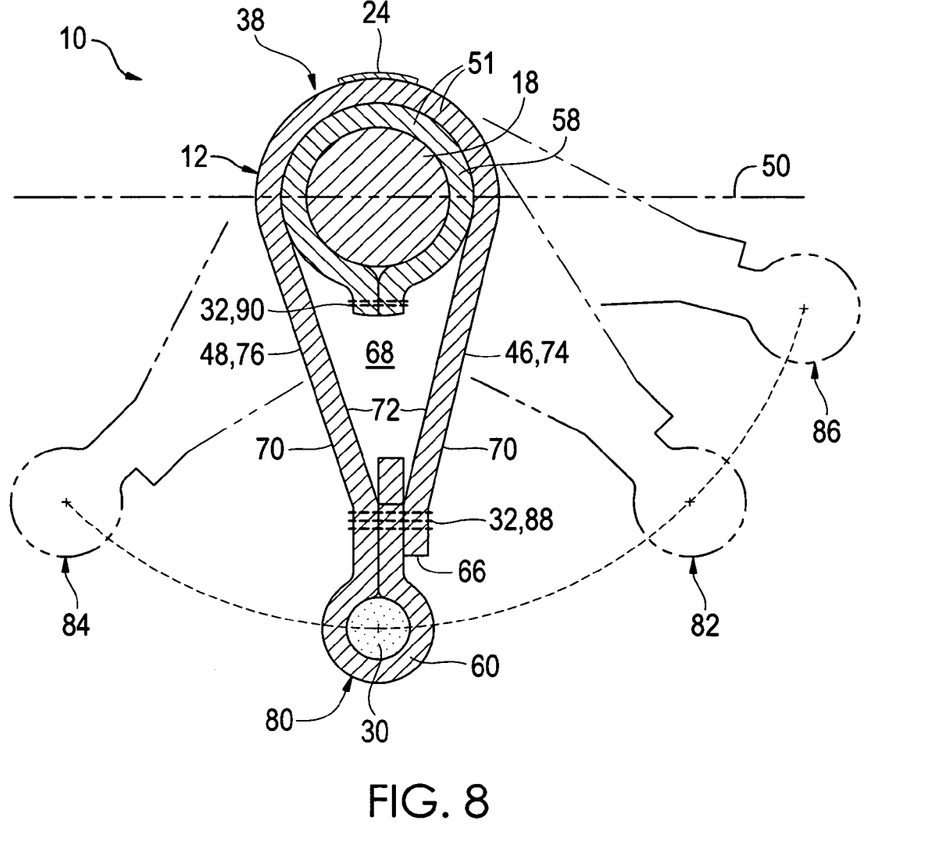
FIG. 8 is a cross-section side view of the preferred embodiment of the present invention.
Figure 9:
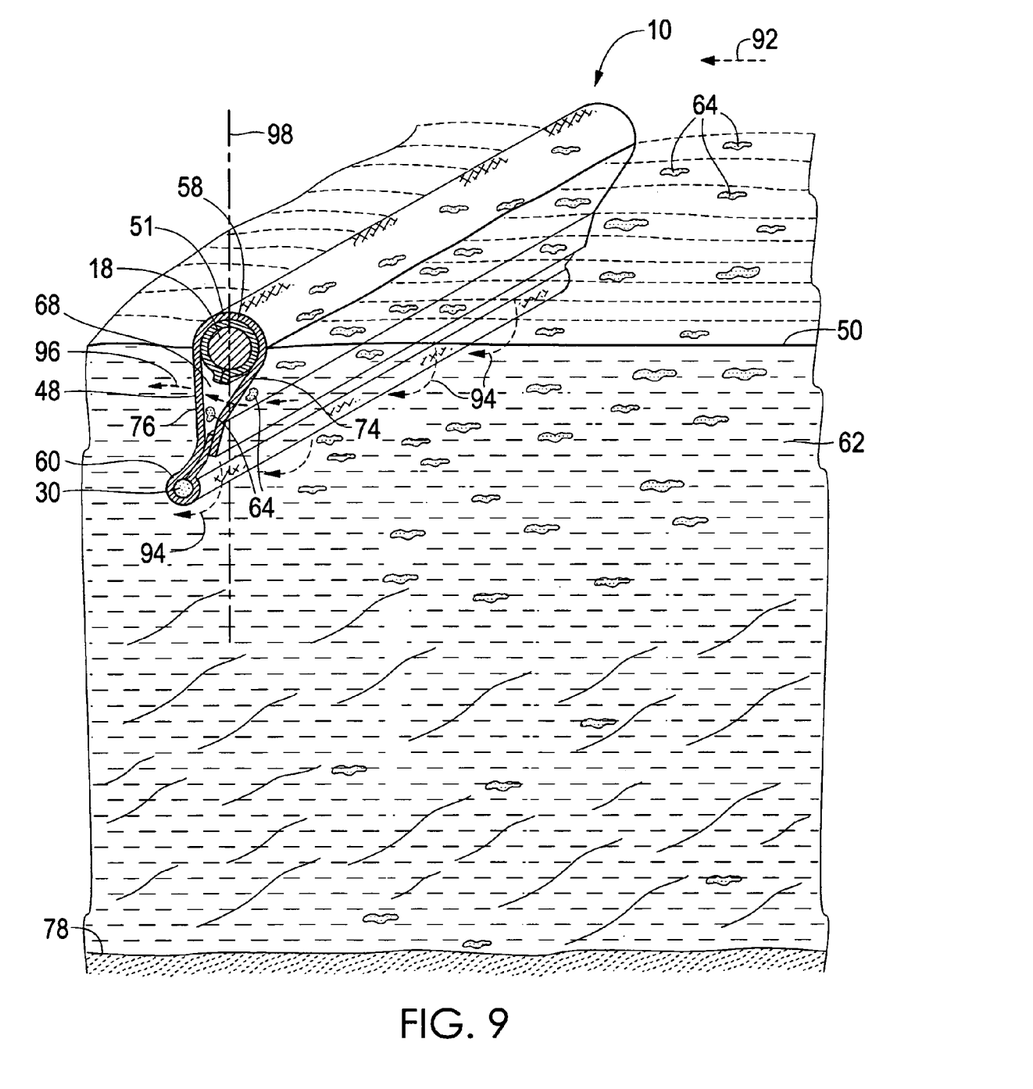
FIG. 9, is an environmental perspective view of the preferred embodiment of the present invention.

Turning to FIGS. 7-9, therein is shown the preferred embodiment of the present invention 10 being a boom curtain, the curtain comprising at least one sheet of flexible material 51 is configured or adapted to have an upper portion 12 having an upper edge portion 38 thereon, a lower portion 14 having a lower edge portion 40 thereon, first and second side portions 42, 44, and first and second walls 74, 76; wherein the flexible material is capable of absorbing contaminants, wherein the flexible material allows water 62 to pass therethrough, wherein the contaminants 64 are absorbed from the water onto the flexible material; a buoyant member 18 disposed proximate the upper portion in a first pocket 58, wherein the buoyant member is effectively buoyant to cause the curtain to float in the water. Pocket 58 is formed from flexible material 51 and is stitched at 32 on its lower side. A weight 30 being disposed proximate the lower edge portion of the lower portion in a second pocket 60, wherein the weight is effectively heavy to cause the lower portion to be biased downwardly from the upper portion when the curtain is in the water; and, a sheet 66 of the flexible material disposed about the upper portion and the lower portion, the first and second walls having an interior space 68 therein, the first and second walls each having outer 70 and inner 72 surfaces, wherein water passes through the interior space. The contaminants 64 are absorbed from the water 62 onto the outer 70 and inner 72 surfaces of the first 74 and second 76 walls as shown in FIG. 9. A cross-sectional side view of the first and second walls 74, 76 of the apparatus resembles a V-shape as shown in FIG. 8. FIG. 7 shows a first strip of hook and loop material 36 disposed on the first side portion of the curtain, wherein the first strip extends from the upper edge portion to the lower edge portion; a second strip of hook and loop material 37 disposed on the second side portion of the curtain extends from the upper edge portion to the lower edge portion, wherein the first and second strips are oppositely configured so that the first and second strips are mating pieces of hook and loop material; a first connector 28 being disposed on the first side portion of the curtain; and, a second connector 34 suitable for connection to the first connector being disposed on the second side portion of the curtain so that the second connector of a first curtain is connected to the first connector of a second curtain so as to form a series of boom comprising a plurality of curtains as shown in as shown in FIG. 7. When the first strip of hook and loop material 36 of a first curtain is connected to the second strip of hook and loop material 37 of a second curtain so as to interconnect said first and second curtains, water is thereby substantially prevented from passing in-between the first and second curtains as shown in FIG. 7. The buoyant member 18 is effectively buoyant to cause the upper portion of the curtain to float low in the water, wherein the level of the water is approximately intermediate the upper portion so that the curtain is stable in the water to cause the lower portion to be biased downwardly from, hang down from or depend from the upper portion when the curtain is in the water as best illustrated in FIGS. 4-5. FIG. 7 also shows a strap 24 disposed proximate the upper edge portion 38 of the curtain, the strap having first and second ends, the strap extending longitudinally along the curtain from the first side portion to the second side portion, the first connector 28 being disposed proximate the first end of the strap, the second connector 34 being disposed proximate the second end of the strap. The straps 24 should be strong enough to allow towing of the booms through water, being lifted onto a ship or being dragged across the ground surface or ship deck.

In many respects the preferred embodiment of the present invention 10 as shown in FIGS. 7-9 is similar to the embodiment shown in FIGS. 1-6. The similarities should be obvious to one skilled in the art. Differences between the two embodiments may include the webbing strap 24 being located at the very top of the unit which is located above the water surface allowing the boom to swing from its normal vertical position to a more horizontal position in either a clockwise or counterclockwise rotational direction during water current flows in either direction as shown in FIGS. 8-9. The V shape of the walls 74, 76 of the double vertical skirting allows water to pass through one layer and then into to the center area of the interior space 68 located between both skirt layers so that the water 62 can then continue its pass through the second vertical absorbent layer having both layers acting as a hydro oil absorbent in a manner wherein the second layer acts somewhat as an additional filter for the contaminants 64 as shown in FIGS. 8-9. The vertical absorbent skirting material 51 comprises two separate layers or walls 74, 76 extending down from both sides of the upper flotation member 18 portion to common point proximate the ballast 30 forming an elongated V as shown in FIGS. 8-9. The near horizontal position that the unit 10 gets in during higher water current flows in either direction acts like a stationary oil skimmer while the water 62 passes below the surface of the boom. This is a near or just below water surface 50 oil absorbing boom that is not intended to reach the floor 78 of the body of water 62 like conventional prior art partial filters. The majority of the absorbent fibers capacity is below the surface of the water 50 as it is easier for the absorbed oil and contaminants 64 to migrate down through the absorbent fibers and into the skirting being that the density of the oil is close to the density of the water. The skirting acts as a lateral under water oil absorbing water/oil separator. The under water absorbent fibers are like a oil reservoir for everything below the water. The oil can migrate down in the water easier than it can wick above the surface of the water. Oil that wicks above the surface of the water is limited due to the resistance of gravity. The open mesh face 56 allows the oil to have a more direct contact with the absorbent fibers. The open mesh 56 also allows the tar balls and oil globs to cling to the surface. The weight of the ballast 30 is set to be just enough weight to pull the skirting down to a vertical position in calm waters with no current flow. It is expected that the weight 30 will swing upward towards the surface of the water 50 during even the slightest current flows preventing the boom form acting like a retaining wall. The height that the weighted portion and skirting rises will depend on the velocity of the current flow.

Turning to FIG. 7, and by way of further explanation, therein is shown the present invention 10 illustrating various angles at which the present invention may be disposed in the water depending on the direction of the current flow of the water. The present invention 10 is shown in a vertical disposition at 80 which is expected to occur in calm water; at a first mid-angle disposition or inclination shown at 82 expected to occur with the current in a first direction and then at 84 with the current in the opposite or second direction as would occur with the change of the tide condition; and, at 84 in a near horizontal disposition or inclination which is expected to occur in a higher water current situation. It is believed that the present invention 10 will absorb oil/contaminants in each of the dispositions shown at 80, 82, 84 and 86 as the contaminants contact the flexible material 51. Also shown is the construction of the present invention 10 showing how the flexible material 51 is adapted or configured in a V-shape over the buoyant member 18 and internal first pocket 58 with the flexible material 51 being stitched together at 32, 90 on its bottom side; and, flexible material 52 configured or adapted to be disposed about or pass over the upper edge portion 38 so as to cover the pocket 58 and then for the material 51 to extend downwardly in a V-shape and be folded back upon itself around the weight 30 and stitched at 88 to form the second pocket 60 and for opposing ends of the sheet of flexible material to also be stitched together at 88 so that stitching 88 forms the second pocket 60 and connects the first and second ends of the sheet of flexible material 51. It may also be possible to construct the present invention 10 by eliminating the first pocket 58. While it is expected that stitching 32 will be the preferred method of joining the portions of the sheets of flexible material it should be recognized that other suitable methods of joining fabric may be used such as gluing, heat welding, or the like.

Turning to FIG. 8, and by way of further explanation, therein are shown two individual units or curtains of the present invention 10 interconnected to form an elongated boom comprising a plurality of curtains.

Turning to FIG. 9, and by way of further explanation, therein is shown a single curtain of the present invention 10 disposed in a body of water 62 above the floor 78, the water having contaminants 64 therein showing the current direction at 92 with the present invention being shown inclined at a relatively small angle away from the vertical axis 98 in the direction of the current flow. Note that contaminants 64 are shown attached to the outer surface of the first, front wall surface 74 and the inner surface of the second wall 76 in the inner space 68. Direction arrows 94 show a portion of the water 62 passing underneath the present invention 10 and direction arrows 96 show a portion of the water passing through the present invention. A more detailed view of the cross-sectional portion of FIG. 9 is shown in FIG. 7.

The present invention 10 can provide proper containment and clean-up of oil spills in rivers, streams, ponds, oceans, processing and/or settling ponds and other environmentally sensitive waterways. The most important characteristic of the present invention 10 is its oil containment or absorption capability, determined by its behavior in relation to water movement. The oil boom should be flexible enough to conform to wave motion yet sufficiently rigid to retain as much oil as possible. The success of containment booming is dependent on currents, wind, and waves. Even minor currents can draw oil under a conventional oil boom and therefore the advantages of the present invention 10 are very important; waves may cause splash-over, and wind and currents may cause the oil spill containment boom to sink or plane. The present invention 10 is designed to minimize these problems.

Other important oil spill boom characteristics are strength, ease and speed of deployment, reliability, weight and cost all of which are provided by the present invention 10. It is essential that an oil boom be sufficiently strong for its intended purpose and tolerate inexpert handling, since trained personnel are not always available. Strength is required to withstand the forces of water and wind when being towed. Ease and speed of deployment combined with reliability are very important in a rapidly changing situation and may strongly influence the selection of equipment. Practical limitations of strength, water drag and weight mean that generally only relatively short lengths can be deployed and maintained in a working configuration. Because of the difficulties of operating multi-ship towed boom systems, the individual units of the present invention 10 are desirable since the individual units can be relatively quickly and easily strung together to form relatively long lengths of boom so as to cover the area of intended use.

The term "absorb" or "absorption" or "absorptive" or similar derivative terms used in this application should be defined in a broad sense to mean to suck up, take up, take in and make part of an existent whole.

We claim:

1. An apparatus for a boom curtain for use in water, the water containing contaminants, comprising:
    a) a boom curtain comprising a series of panels joined together in series, each panel comprising flexible material and having an upper portion, a lower portion, a central section joining said upper and lower portions, and first and second side edges;
    b) wherein said flexible material is capable of absorbing contaminants, wherein said flexible material allows water to pass therethrough, and wherein the contaminants are absorbed from the water onto said flexible material;
    c) a buoyant member disposed proximate said upper portion, wherein said buoyant member is effectively buoyant to cause said curtain to float in the water;
    d) a weight being disposed proximate said lower portion, wherein said weight is effectively heavy to cause said lower portion to be biased downwardly from said upper portion when said curtain is in the water;
    e) a sheet of said flexible material disposed about said upper portion and said lower portion and having a central section of said flexible material extending between said upper and lower portions;
    f) a strip of hook and loop material extending along side edges of each said panel extending from a top edge of said panel to a bottom edge of said panel, said adjoining panels being interconnected by overlapping of said hook and loop material strips and whereby end edges of said upper and lower portions containing said buoyant member and said weight, respectively, abut each other whereby said flexible material of adjacent panels are aligned;
    g) a strap mounted on each said panel extending a full length of each panel and attached to said flexible material between said upper and lower portions, each strap having a connector at each end thereof, whereby adjacent panels are linked together by adjacent connectors to prevent flow of water between said panels and to provide a main support for holding individual panels together; and
    h) wherein said central section has a spunbound layer on one side of said flexible material and an outer mesh-like layer on an opposite side of said flexible material for allowing water flow through said central section.

2. The apparatus of claim 1, wherein said central section is comprised of two layers of said flexible material.

3. The apparatus of claim 1, wherein said upper portion has a first pocket therein containing buoyant material and said lower portion has a second pocket therein containing said weight.

4. The apparatus of claim 1, further comprising spaced connectors mounted on an outer surface of said strap.

5. The apparatus of claim 1, wherein said buoyant member is effectively buoyant to cause said upper portion of said curtain to float low in the water, wherein the level of the water is approximately intermediate said upper portion so that said curtain is stable in the water to cause said lower portion to be biased downwardly from said upper portion when said curtain is in the water.

6. A method of making a boom curtain for use in water, the water containing contaminants, comprising the steps of:
    a) providing a boom curtain comprising a series of panels joined together in series, each panel comprising flexible material and having an upper portion, a lower portion, a central section joining said upper and lower portion and first and second side edges;
    b) wherein the flexible material is capable of absorbing contaminants, wherein the flexible material allows water to pass therethrough, wherein the contaminants are absorbed from the water onto the flexible material;
    c) providing a buoyant member proximate the upper portion, wherein the buoyant member is effectively buoyant to cause the curtain to float in the water;
    d) providing a weight proximate the lower portion, wherein the weight is effectively heavy to cause the lower portion to be biased downwardly from the upper portion when the curtain is in the water; and,
    e) providing a sheet of the flexible material disposed about the upper portion and the lower, portion and having a central section of said flexible material extending between said upper and lower portions;
    f) providing a strip of hook and loop material along side edges of each said panel extending from a top edge of said panel to a bottom edge of said panel, said adjoining panels being interconnected by overlapping of said hook and loop material strips and whereby end edges of said upper and lower portions containing said buoyant member and said weight, respectively, abut each other and absorbent material of adjacent panels are aligned;
    g) providing a strap mounted on each said panel extending a full length of each panel and attached to said flexible material between said upper and lower portions, each strap having a connector at each end thereof, whereby adjacent panels are linked together by adjacent connectors to prevent flow of water between said panels and to provide a main support for holding individual panels together; and
    h) wherein said central section has a spunbound layer on one side of said flexible material and an outer mesh-like layer on an opposite side of said flexible material for allowing water flow through said central section.

7. The method of claim 6, wherein said central section is comprised of two layers of said flexible material.

8. The method of claim 6, wherein said upper portion has a first pocket therein containing buoyant material and the lower portion has a second pocket containing the weight.

9. The method of claim 6, further comprising spaced connectors mounted on an outer surface of said strap.

10. The method of claim 6, wherein the buoyant member is effectively buoyant to cause the upper portion of the curtain to float low in the water, wherein the level of the water is approximately intermediate the upper portion so that the curtain is stable in the water to cause the lower portion to be biased downwardly from the upper portion when the curtain is in the water.

11. A boom curtain panel for use in water, the water containing contaminants, comprising:
   a) an, upper portion and a spaced lower portion, first and second end edges, and front and rear surfaces;
   b) flexible material joining said upper and lower portions, said flexible material capable of absorbing contaminants, wherein said flexible material allows water to pass therethrough, and wherein the contaminants are absorbed from the water onto said flexible material;
   c) a buoyant member disposed proximate said upper portion, wherein said buoyant member is effectively buoyant to cause said curtain panel to float in the water;
   d) a weight being disposed proximate said lower portion, wherein said weight is effectively heavy to cause said lower portion to be biased downwardly from said upper portion when said curtain panel is in the water, and whereby said buoyant member has a larger cross-section than said weight portion;
   e) a first strip of hook and loop material extending along said first end edge of said panel;
   f) a second strip of hook and loop material extending along said second end edge of said panel, wherein said first and second strips are oppositely configured so that said first and second strips are mating pieces of hook and loop material, whereby adjacent curtain panels have overlapping and engaging respective book and loop strips:
   g) a first connector being disposed proximate said first side edge of said curtain panel and along a top surface of said panel; and,
   h) a second connector being disposed on said second side edge of said curtain panel along a top surface of said panel, wherein said second connector of a first said curtain panel is connected to said first connector of a second, adjacent curtain panel so as to form a boom comprising a plurality of curtain panels in series;
   i) said flexible material in a continuous sheet surrounding both said upper and lower portions and forming a V-shaped cross-section connecting said upper and lower portions with a central section between said upper and lower portions, ends of said flexible material terminating adjacent each other above said weight wherein three layers are connected together using stitching; and,
   j) an interior space thereby formed between said upper and lower portions enclosed by separated layers of said flexible material.

12. The apparatus of claim 11, wherein said upper portion has a pocket therein, said buoyant member being disposed in said pocket.

13. The apparatus of claim 12, wherein said lower portion has a pocket therein, said weight being disposed in said lower portion pocket.

14. The apparatus of claim 13, wherein said first strip of hook and loop material of a first said curtain panel is connected to said second strip of hook and loop material of a second said curtain panel so as to interconnect said first and second curtain panels, wherein water is thereby substantially prevented from passing in-between said first and second curtain panels, wherein a boom is formed comprising a plurality of said curtain panels in series.

15. The apparatus of claim 11, wherein said buoyant member is effectively buoyant to cause said upper portion of said curtain to float low in the water, wherein the level of the water is intermediate said upper portion so that said curtain is stable in the water to cause said lower portion to be biased downwardly from said upper portion when said curtain is in the water.

16. The apparatus of claim 11, further comprising a strap being disposed on said curtain panel, said strap having first and second ends, said strap extending longitudinally along said curtain panel from said first side edge to said second side edge, a first connector being disposed on said first end of said strap, a second connector being disposed on said second end of said strap.

17. A method of making a boom curtain panel for use in water, the water containing contaminants, comprising the steps of:
   a) providing a sheet of flexible material;
   b) wherein the flexible material is capable of absorbing contaminants, wherein the flexible material allows water to pass therethrough, wherein the contaminants are absorbed from the water onto the flexible material;
   c) providing a buoyant member on an upper portion of said panel wherein the buoyant member is effectively buoyant to cause the curtain panel to float in the water;
   d) providing a weight on a lower portion of said curtain panel, wherein the weight is effectively heavy to cause the lower portion to be biased downwardly from the upper portion when the panel is in the water, wherein the buoyant member has a larger cross section than said weight;
   e) providing a first strip of hook and loop material extending along a first end edge of said panel, wherein the first strip extends from a top edge to a bottom edge of said panel;
   f) providing a second strip of hook and loop material extending along a second end edge of said panel, wherein the second strip extends from to the top edge to the bottom edge of said panel, wherein the first and second strips are oppositely configured so that the first and second strips are mating pieces of hook and loop material, whereby adjacent curtain panels have overlapping and engaging respective hook and loop strips;
   g) providing a first connector on the first side edge of the curtain panel and along a top surface of said panel;
   h) providing a second connector on the second side edge of the curtain panel along a top surface of said panel, connecting the second connector of a first curtain panel to the first connector of a second curtain panel so as to form a boom comprising a plurality of curtain panels in series;
   i) said flexible material surrounding both said upper and lower portions and forming a V-shaped cross-section connecting said upper and lower portions with a central section between said upper and lower portions, ends of said flexible material terminating adjacent each other above said weight wherein three layers of said flexible material are connected together using stitching; and,
   j) an interior spaced formed between said upper and lower portions enclosed by separated layers of said flexible material.

18. The method of claim 17, wherein the upper portion has a pocket therein containing the buoyant member.

19. The method of claim 18, wherein the lower portion has a pocket therein containing the weight.

20. The method of claim 17, wherein the first strip of hook and loop material of a first curtain panel is connected to the second strip of hook and loop material of a second curtain panel so as to interconnect the first and second curtain panels, wherein water is thereby substantially prevented from passing in-between the first and second curtain panels, wherein a boom is formed comprising a plurality of the curtain panels in series.

21. The method of claim 17, wherein the buoyant member is effectively buoyant to cause the upper portion of the curtain to float low in the water, wherein the level of the water is intermediate the upper portion so that the curtain is stable in the water to cause the lower portion to be biased downwardly from the upper portion when the curtain is in the water.

* * * * *